(12) United States Patent
Dong et al.

(10) Patent No.: US 12,166,657 B2
(45) Date of Patent: Dec. 10, 2024

(54) FORWARDING PATH DETERMINING METHOD AND APPARATUS

(71) Applicant: HUAWEI TECHNOLOGIES CO., LTD., Guangdong (CN)

(72) Inventors: Jie Dong, Beijing (CN); Zongpeng Du, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 399 days.

(21) Appl. No.: 17/571,161

(22) Filed: Jan. 7, 2022

(65) Prior Publication Data

US 2022/0141120 A1 May 5, 2022

Related U.S. Application Data

(63) Continuation of application No. PCT/CN2020/105639, filed on Jul. 29, 2020.

(30) Foreign Application Priority Data

Sep. 11, 2019 (CN) .......................... 201910860014.3

(51) Int. Cl.
*H04L 45/02* (2022.01)
(52) U.S. Cl.
CPC .................................... *H04L 45/02* (2013.01)
(58) Field of Classification Search
CPC ....................................................... H04L 45/02
See application file for complete search history.

(56) References Cited

U.S. PATENT DOCUMENTS 9,860,169 B1 * 1/2018 Ninan ..................... H04L 45/66
2006/0171320 A1 8/2006 Vasseur et al.
(Continued)

FOREIGN PATENT DOCUMENTS

CN 104168194 A 11/2014
CN 107547293 A 1/2018
(Continued)

OTHER PUBLICATIONS

D.Dukes, Ed. et al, SR For SDWAN: VPN with Underlay SLA draft-dukes-spring-sr-for-sdwan-01, Network Working Group Internet-Draft, Dec. 4, 2018, total 16 pages.
(Continued)

*Primary Examiner* — Won Tae C Kim
(74) *Attorney, Agent, or Firm* — WOMBLE BOND DICKINSON (US) LLP

(57) ABSTRACT

This application provides a forwarding path determining method and an apparatus. In determining a forwarding path, a second network device sends a routing update message to a first network device, where the routing update message carries a first identifier list, the first identifier list includes a binding segment identifier, and the first identifier list indicates a first forwarding path that is from the second network device to a third network device. By using the method, a second forwarding path from the first network device to the third network device is determined. According to the method provided in this application, when there is no controller or controllers cannot communicate with each other, routing advertisement of the binding end identifier is implemented, to determine a forwarding path. This helps simplify a packet forwarding control process.

19 Claims, 8 Drawing Sheets

(56) References Cited

U.S. PATENT DOCUMENTS

| | | | | |
|---|---|---|---|---|
| 2007/0192451 A1* | 8/2007 | Tran | .................... | H04L 12/1886 709/223 |
| 2013/0322436 A1* | 12/2013 | Wijnands | ................ | H04L 45/18 370/389 |
| 2015/0207736 A1 | 7/2015 | Roch et al. | | |
| 2016/0261486 A1 | 9/2016 | Fang et al. | | |
| 2017/0317929 A1 | 11/2017 | Chen et al. | | |

FOREIGN PATENT DOCUMENTS

| | | | |
|---|---|---|---|
| CN | 107770073 | A | 3/2018 |
| CN | 107787020 | A | 3/2018 |
| CN | 109962847 | A | 7/2019 |
| CN | 109981457 | A | 7/2019 |
| CN | 109981458 | A | 7/2019 |
| DJ | 105634940 | A | 6/2016 |
| EP | 3468117 | A1 | 4/2019 |
| JP | 2010004492 | A | 1/2010 |
| WO | 2017141078 | A1 | 8/2017 |
| WO | 2017141079 | A1 | 8/2017 |
| WO | 2017193733 | A1 | 11/2017 |
| WO | 2019128950 | A1 | 7/2019 |

OTHER PUBLICATIONS

E. Rosen, Ed. et al, The BGP Tunnel Encapsulation Attribute draft-ietf-idr-tunnel-encaps-07, IDR Working Group Internet-Draft, Jul. 17, 2017, total 41 pages.

C. Filsfils et al, SRv6 Network Programming, draft-ietf-spring-srv6-network-programming-00, SPRINGInternet-Draft, Apr. 24, 2019, total 42 pages.

Request for Comments: 4271, Y. Rekhter, Ed. et al, A Border Gateway Protocol 4 (BGP-4), Network Working Group, Jan. 2006, total 104 pages.

David Lebrun et al, Software Resolved Networks: Rethinking Enterprise Networks with IPv6 Segment Routing, SOSR 18, Mar. 26, 27, 2018, Los Angeles, CA, USA, 2018 Association for Computing Machinery, total 14 pages.

* cited by examiner

FORWARDING PATH DETERMINING METHOD AND APPARATUS

CROSS-REFERENCE TO RELATED APPLICATIONS

This application is a continuation of International Application No. PCT/CN2020/105639, filed on Jul. 29, 2020, which claims priority to Chinese Patent Application No. 201910860014.3, filed on Sep. 11, 2019. The disclosures of the aforementioned applications are hereby incorporated by reference in their entireties.

TECHNICAL FIELD

This application relates to the communication field, and to a forwarding path determining method and an apparatus.

BACKGROUND

Segment routing (SR) is a protocol designed based on source routing to forward a data packet on a network. In an SR network, an ingress node in a network that supports the SR inserts a group of sequential segment identifiers into a data packet to explicitly specify a forwarding path of the data packet. SR applied to a Multi-Protocol Label Switching (MPLS) data plane is referred to as MPLS-based segment routing (MPLS-SR or SR-MPLS). SR applied to an Internet Protocol Version 6 (IPv6) data plane is referred to as IPv6-based segment routing (SRv6).

A segment identifier (SID) is an ID that describes a segment, for example, represents a node or a link. In the MPLS-SR, the SID is represented by an MPLS label, while in the SRv6, the SID is represented by a 128-bit value.

A segment identifier list (e.g., a Segment ID List) is a list that includes a group of segment identifiers. After receiving a data packet, an ingress node inserts one SID list into the data packet, to explicitly indicate a forwarding path.

The segment identifier may be represented by an endpoint layer 3 cross-connect segment identifier (End.X SID, where End indicates the endpoint, X indicates crossing, and SID indicates the segment identifier). For any node in the SR network, the node may advertise at least one End.X SID, and each End.X SID is used to identify an IP layer link directly connected to the node.

A binding segment identifier (BSID) is bound to a SID list to indicate a forwarding path. When receiving a valid BSID, an ingress node in the SR network performs a BSID-related operation. In an IPv6 segment routing (SRv6) network, a defined BSID-related operation may be: inserting, based on different BSID functions, a new SRH header (e.g., such as End.B6.Insert) or a new outer IPv6 header (e.g., such as End.B6.Encaps) including an SRH.

In an actual application, because a segment routing network is based on a technology of the source routing, a controller usually delivers a BSID or SID list to an ingress node to control data packet forwarding.

That is, in the conventional technology, a device in the SR network needs to interact with a related controller to obtain a forwarding path that meets a requirement. When the forwarding path is a forwarding path that crosses domains, a specified forwarding path is further determined by interaction between a plurality of controllers. However, when no controller is available or two controllers in charge of different domains cannot communicate with each other, such a forwarding path that matches the requirement cannot be obtained.

SUMMARY

Embodiments disclosed herein may provide a forwarding path determining method and an apparatus, to resolve a problem that an entire packet forwarding control process is complex because an ingress node for inter-domain packet forwarding depends on interaction with a controller, or inter-domain packet forwarding cannot be implemented without a controller.

In an embodiment, a forwarding path determining method is provided. The method is applied to a first network device. The first network device may be a router, a switch, or a virtual network device that runs on a general-purpose server and has an IP forwarding function. This is not specifically limited in this application. The method includes the following operations.

The first network device receives a first routing update message sent by a second network device, where the first routing update message is a Border Gateway Protocol routing update message, the first routing update message carries a first identifier list, the first identifier list indicates a first forwarding path that is from the second network device to a third network device, the first identifier list includes a binding segment identifier, the first forwarding path is a forwarding path in a segment routing network, and the first network device and the third network device do not belong to a same autonomous system (AS) domain; and the first network device determines a second forwarding path based on the first identifier list carried in the first routing update message, where the second forwarding path is a forwarding path that is from the first network device to the third network device, and the second forwarding path includes the first forwarding path.

In an embodiment, an identifier list indicating a forwarding path from the second network device to the third network device is transmitted to the first network device, where the identifier list includes a segment identifier or a binding segment identifier, so that in a scenario in which there is no controller, or there are a plurality of controllers but the controllers cannot communicate with each other, an inter-domain forwarding path is determined. This helps simplify a packet forwarding control process.

In an embodiment, the first network device obtains a network performance identifier. That the first network device determines a second forwarding path based on the first identifier list carried in the first routing update message includes: The first network device determines the second forwarding path based on the network performance identifier and the first identifier list, where the second forwarding path meets a network performance requirement indicated by the network performance identifier.

In an embodiment, that the first network device obtains a network performance identifier includes: The network performance identifier is carried in the first routing update message, and the first network device obtains the network performance identifier from the first routing update message; or the first network device receives a control message sent by a controller, and the first network device obtains the network performance identifier from the control message.

In an embodiment, the network performance identifier is carried in the first routing update message, so that for a service that has a network performance requirement, a forwarding path meeting the network performance requirement may be further determined. For example, when a voice service requires a forwarding path with lower latency if possible, a second forwarding path that meets the performance requirement can be determined for the service in this manner.

In an embodiment, after the first network device determines the second forwarding path based on the first routing update message, the method further includes: The first network device generates a first mapping relationship, where the first mapping relationship is a mapping relationship between a first binding segment identifier corresponding to the first network device and a segment identifier of the first network device, or the first mapping relationship is a mapping relationship between a first binding segment identifier corresponding to the first network device and an identifier set, where the identifier set includes a segment identifier of the first network device and the first identifier list.

In an embodiment, on each network device on the forwarding path, a mapping relationship for a corresponding binding segment identifier and a path indicated by the binding segment identifier is generated. The mapping relationship may be stored in a routing table or a forwarding table of the network device. Therefore, after receiving a data packet, the network device on the forwarding path may forward the data packet along the preferred forwarding path that meets the performance requirement.

In an embodiment, the first routing update message further includes an identifier of a destination network device. When the first network device is an ingress node, the method further includes: The first network device generates a second mapping relationship, where the second mapping relationship is a mapping relationship between a second binding segment identifier corresponding to the first network device and the identifier of the destination network device; the first network device generates a third mapping relationship, where the third mapping relationship is a mapping relationship between the second binding segment identifier and a binding segment identifier set, and the binding segment identifier set includes the first binding segment identifier and the first identifier list, or the binding segment identifier set includes only the first binding segment identifier; the first network device receives a data packet, where the data packet carries the identifier of the destination network device; and the first network device forwards the data packet along the second forwarding path based on the second mapping relationship and the third mapping relationship.

In an embodiment, after receiving the data packet, the ingress node in the segment routing network processes the data packet, so that the network device on the determined forwarding path may forward the data packet along the determined forwarding path. An existing technology is further used in the forwarding process, to reduce complexity of the solution.

In an embodiment, the network performance requirement includes at least one of the following: latency, bandwidth, packet loss, and jitter.

In an embodiment, a network administrator may define as many network performance requirements in the network as possible, and further determine a forwarding path that meets the network performance requirements, to meet requirements of different services.

In an embodiment, the first identifier list is carried in a first type length value TLV of the first routing update message.

The first identifier list indicating the first forwarding path is carried in the first routing update message in a form of a TLV, and the TLV is reused. This helps fast implementation of this solution and fast deployment in the network.

In an embodiment, when the first network device is a transit node in the segment routing network, after the first network device determines the second forwarding path based on the first routing update message, the method further includes: The first network device sends a second routing update message to a fourth network device, where the second routing update message carries a second identifier list.

In an embodiment, the second routing update message further carries the network performance identifier.

In an embodiment, the forwarding path in the segment routing network may be transmitted by using a routing update message, and a method in which a controller is the ingress node or the ingress node performs automatic calculation is not necessarily used, so that application of a segment routing technology in a network is simpler.

In a possible manner, when the first mapping relationship is the mapping relationship between the first binding segment identifier and the segment identifier of the first network device, the second identifier list includes the first binding segment identifier and the first identifier list; or when the first mapping relationship is the mapping relationship between the first binding segment identifier and the identifier set, the second identifier list includes only the first binding segment identifier.

In an embodiment, the first network device and the second network device belong to different autonomous system AS domains.

In an embodiment, a network device in the segment routing network transmits a forwarding path in the segment routing network by using a BGP routing update message; and the forwarding path is even a forwarding path that crosses AS domains. A method in which a forwarding path is determined through communication between a network device and a controller or through communication between a plurality of controllers is not necessarily used. This helps simplify a packet forwarding control process.

In an embodiment, a forwarding path determining method is provided. The method is applied to a second network device. The second network device may be a router, a switch, or a virtual network device that runs on a general-purpose server and has an IP forwarding function. This is not specifically limited in this application. The method includes:

The second network device determines a first identifier list, where the first identifier list indicates a first forwarding path that is from the second network device to a third network device, the first identifier list includes a binding segment identifier, and the first forwarding path is a forwarding path in a segment routing network; and the second network device sends a first routing update message to a first network device, where the first routing update message is a Border Gateway Protocol routing update message, the first routing update message carries the first identifier list, and the first network device and the third network device do not belong to a same autonomous system AS domain.

In an embodiment, a routing update message may transmit a SID list, a BSID list, or a list including a SID and a BSID, where the SID list, the BSID list, or the list including the SID and the BSID indicates a forwarding path, so that in a scenario in which there is no controller, or there are a plurality of controllers but the controllers cannot communicate with each other, an inter-domain forwarding path may also be determined by using this method. This helps simplify a packet forwarding control process.

In an embodiment, before the second network device determines a first identifier list, the method further includes: The second network device obtains a network performance identifier; and the second network device determines the first forwarding path based on the network performance identifier, where the first forwarding path meets a network performance requirement indicated by the network performance identifier.

In an embodiment, that the second network device obtains a network performance identifier includes: The second network device receives a second routing update message, and the second network device obtains the network performance identifier from the second routing update message; or the second network device receives a control message sent by a controller, and the second network device obtains the network performance identifier from the control message.

In an embodiment, the network performance requirement includes at least one of the following: latency, bandwidth, packet loss, and jitter.

In an embodiment, by using a network performance identifier, for a service that has a network performance requirement, a forwarding path meeting the network performance requirement may be further determined. For example, when a voice service requires a forwarding path with low latency, a forwarding path that meets the performance requirement can be determined for the service in this manner.

In an embodiment, the second network device generates a first mapping relationship between a first binding segment identifier corresponding to the second network device and an identifier set, where the set identifier includes a segment identifier of the second network device; the second network device receives a data packet, where the data packet carries the first binding segment identifier; and the second network device forwards the data packet along the first forwarding path based on the mapping relationship.

In an embodiment, the first identifier list includes the first binding segment identifier.

In an embodiment, the first identifier list is carried in a first type length value TLV of the first routing update message.

In an embodiment, on each network device on the forwarding path, a mapping relationship for a corresponding binding segment identifier and a path indicated by the binding segment identifier is generated. The mapping relationship may be stored in a routing table or a forwarding table of the network device. Therefore, after receiving a data packet, the network device on the forwarding path may forward the data packet along the preferred forwarding path that meets the performance requirement.

In an embodiment, a first network device is provided. The first network device has a function of determining a forwarding path as disclosed herein. The function may be implemented based on hardware, or may be implemented based on hardware executing corresponding software. The hardware or the software includes one or more modules corresponding to the foregoing function. The first network device may be a router, a switch, or a virtual network device that runs on a general-purpose server and has an IP forwarding function. This is not specifically limited in this application.

The first network device includes: a receiving unit, configured to receive a first routing update message sent by a second network device, where the first routing update message is a Border Gateway Protocol routing update message, the first routing update message carries a first identifier list, the first identifier list indicates a first forwarding path that is from the second network device to a third network device, the first identifier list includes a binding segment identifier, the first forwarding path is a forwarding path in a segment routing network, and the first network device and the third network device do not belong to a same autonomous system AS domain; and a processing unit, configured to determine a second forwarding path based on the first identifier list carried in the first routing update message, where the second forwarding path is a forwarding path that is from the network device to the third network device, and the second forwarding path includes the first forwarding path.

In an embodiment, the first network device further includes an obtaining unit, configured to obtain a network performance identifier. Correspondingly, that the processing unit is configured to determine the second forwarding path based on the first identifier list carried in the first routing update message is specifically: The processing unit determines the second forwarding path based on the network performance identifier and the first identifier list, where the second forwarding path meets a network performance requirement indicated by the network performance identifier.

In an embodiment, that the obtaining unit is configured to obtain the network performance identifier is specifically: The network performance identifier is carried in the first routing update message, and the obtaining unit is configured to obtain the network performance identifier from the first routing update message; or the receiving unit is further configured to receive a control message sent by a controller, and the obtaining unit is configured to obtain the network performance identifier from the control message.

In an embodiment, after the processing unit is configured to determine the second forwarding path based on the first routing update message, the processing unit is further configured to generate a first mapping relationship, where the first mapping relationship is a mapping relationship between a first binding segment identifier corresponding to the first network device and a segment identifier of the first network device, or the first mapping relationship is a mapping relationship between a first binding segment identifier corresponding to the first network device and an identifier set, where the identifier set includes a segment identifier of the first network device and the first identifier list.

In an embodiment, the first network device further includes a sending unit, the first routing update message further includes an identifier of a destination network device. When the first network device is an ingress node, the processing unit is further configured to generate a second mapping relationship, where the second mapping relationship is a mapping relationship between a second binding segment identifier corresponding to the first network device and the identifier of the destination network device; the processing unit is further configured to generate a third mapping relationship, where the third mapping relationship is a mapping relationship between the second binding segment identifier and a binding segment identifier set, and the binding segment identifier set includes the first binding segment identifier and the first identifier list, or the binding segment identifier set includes only the first binding segment identifier; the receiving unit is further configured to receive a data packet, where the data packet carries the identifier of the destination network device; and the sending unit is further configured to forward the data packet along the second forwarding path based on the second mapping relationship and the third mapping relationship.

In an embodiment, the network performance requirement includes at least one of the following: latency, bandwidth, packet loss, and jitter.

In an embodiment, the first identifier list is carried in a first type length value TLV of the first routing update message.

In an embodiment, when the first network device is a transit node in the segment routing network, after the processing unit determines the second forwarding path based on the first routing update message, the sending unit is further configured to send a second routing update message to a fourth network device, where the second routing update message carries a second identifier list.

In an embodiment, when the first mapping relationship is the mapping relationship between the first binding segment identifier and the segment identifier of the first network device, the second identifier list includes the first binding segment identifier and the first identifier list; or when the first mapping relationship is the mapping relationship between the first binding segment identifier and the identifier set, the second identifier list includes only the first binding segment identifier.

In an embodiment, the first network device and the second network device belong to different autonomous system AS domains.

In an embodiment, a second network device is provided. The second network device has a function of determining a forwarding path as disclosed herein. The second network device may be a router, a switch, or a virtual network device that runs on a general-purpose server and has an IP forwarding function. This is not specifically limited in this application.

The second network device includes: a processing unit, configured to determine a first identifier list, where the first identifier list indicates a first forwarding path that is from the second network device to a third network device, the first identifier list includes a binding segment identifier, and the first forwarding path is a forwarding path in a segment routing network; and a sending unit, configured to send a first routing update message to a first network device, where the first routing update message is a Border Gateway Protocol (BGP) routing update message, the first routing update message carries the first identifier list, and the first network device and the third network device do not belong to a same autonomous system AS domain.

In an embodiment, the second network device further includes an obtaining unit. Before the processing unit is configured to determine the first identifier list, the obtaining unit is configured to obtain a network performance identifier. The processing unit is further configured to determine the first forwarding path based on the network performance identifier, where the first forwarding path meets a network performance requirement indicated by the network performance identifier.

In an embodiment, the second network device further includes a receiving unit, and that the obtaining unit is configured to obtain a network performance identifier is specifically: The receiving unit is configured to receive a second routing update message, and the obtaining unit is configured to obtain the network performance identifier from the second routing update message; or the receiving unit is configured to receive a control message sent by a controller, and the obtaining unit is configured to obtain the network performance identifier from the control message.

In an embodiment, the processing unit is further configured to generate a first mapping relationship between a first binding segment identifier corresponding to the second network device and an identifier set, where the set identifier includes a segment identifier of the second network device; the receiving unit is further configured to receive a data packet, where the data packet carries the first binding segment identifier; and the sending unit is further configured to forward the data packet along the first forwarding path based on the mapping relationship.

In an embodiment, the first identifier list includes the first binding segment identifier.

In an embodiment, a first network device is provided, where the first network device includes a processor, a memory, and a transceiver. The memory stores at least one instruction, and the processor is configured to execute a computer-readable instruction in the memory, so that the first network device performs the forwarding path determining method as disclosed herein.

In an embodiment, a second network device is provided, where the second network device includes a processor, a memory, and a transceiver. The memory stores at least one instruction, and the processor is configured to execute a computer-readable instruction in the memory, so that the second network device performs the forwarding path determining method as disclosed herein.

In an embodiment, a computer-readable storage medium is provided. The storage medium stores at least one instruction, and the instruction is loaded by a processor to perform the forwarding path determining method as disclosed herein.

In an embodiment, a computer program is provided. The computer program includes a computer program used to perform the method as disclosed herein.

In an embodiment, a computer program is provided. The computer program includes a computer program used to perform the method as disclosed herein.

BRIEF DESCRIPTION OF DRAWINGS

The following briefly describes accompanying drawings and embodiments. It is clearly that, the accompanying drawings in the following description merely show some embodiments, and a person of ordinary skill in the art can derive others without creative efforts. These other embodiments shall also be considered as falling within the scope of the present invention.

DESCRIPTION OF EMBODIMENTS

In order to enable a person skilled in the art to better understand embodiments disclosed herein, the following describes embodiments in more detail with reference to accompanying drawings and implementations.

In the embodiments disclosed herein, terms such as "first" and "second" are used to distinguish same items or similar items that have basically same functions. It should be understood that there is no logical or time sequence dependency between "first", "second", and "n$^{th}$", and a quantity and an execution sequence are not limited.

It should be understood that a list in this application may include one element, or may include a plurality of elements. A quantity of elements included in the list is not limited in this application.

It should be understood that a set in this application may include one element, or may include a plurality of elements. A quantity of elements included in the set is not limited in this application. It should be understood that this application may be applied to MPLS-SR, or may be applied to SRv6. This is not specifically limited in this application.

Terms in this application are described as follows.

Based on SR traffic engineering (e.g., with a SR Policy), an ingress node embeds, in a packet header of a data packet, information about a forwarding path of the data packet on a network. In this way, the data packet can traverse a network along a specified path. One SR Policy is defined as an optimization objective between an ingress node and a destination node, which can be identified using the following tuple: (ingress node (Head-end), color (Color), destination node (End-point)). One SR Policy corresponds to one or more BSIDs, each BSID corresponds to one or more candidate paths (CP), and one CP includes one or more segment identifier lists (SID List). Each segment identifier list indicates a path from a source to a destination, and indicates a forwarding device on the path in the network to perform forwarding along a specified path, rather than a default and shortest path to a destination node calculated based on an Interior Gateway Protocol (IGP). Generally, one SR Policy and a corresponding CP are determined through pre-configuration or through automatic calculation by an ingress node. Generally, one SR Policy preferentially selects a CP as a forwarding path. A specific pre-configuration manner includes configuring a CP on a device by using a command line, configuring by a network management system, or configuring by an SDN controller. After receiving a data packet that complies with the SR Policy, before forwarding the packet, the ingress node parses a binding segment identifier (BSID) corresponding to the SR Policy and a segment identifier list corresponding to the BSID. A corresponding SRH is carried in the data packet, so that the packet can be forwarded along a specified path.

Figure 1:
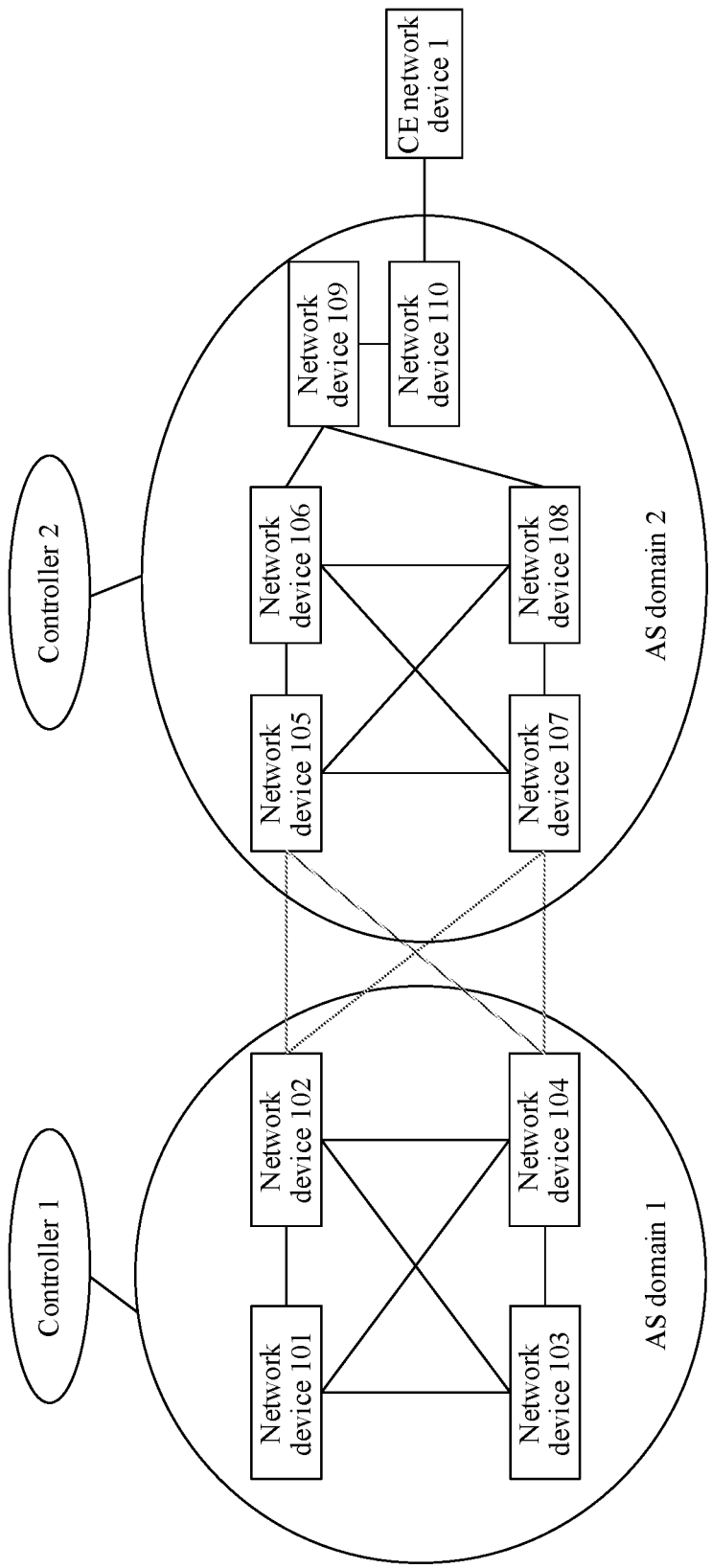
FIG. 1 is a schematic diagram of an application scenario according to an embodiment.

FIG. 1 is a schematic diagram of an application scenario according to an embodiment of this application. In the scenario shown in FIG. 1, a network device 101, a network device 102, a network device 103, and a network device 104 belong to one AS domain, that is, an AS domain 1 shown in FIG. 1. A network device 105, a network device 106, a network device 107, a network device 108, a network device 109, and a network device 110 belong to another AS domain, that is, an AS domain 2 shown in FIG. 1. The network device 101 is separately connected to the network device 102, the network device 103, and the network device 104. The network device 102 is separately connected to the network device 101, the network device 103, the network device 104, the network device 105, and the network device 107. The network device 103 is separately connected to the network device 101, the network device 102, and the network device 104. The network device 104 is separately connected to the network device 101, the network device 102, the network device 103, the network device 105, and the network device 107. The network device 105 is separately connected to the network device 102, the network device 104, the network device 106, the network device 108, and the network device 107. The network device 107 is separately connected to the network device 102, the network device 104, the network device 105, the network device 106, and the network device 108. The network device 106 is separately connected to the network device 105, the network device 107, the network device 109, and the network device 108. The network device 108 is separately connected to the network device 105, the network device 106, the network device 109, and the network device 107. The network device 109 is separately connected to the network device 106, the network device 108, and the network device 110. The network device 110 is separately connected to the network device 109, and the network device 110 is connected to a CE network device 1. The network device 110, the network device 105, and the network device 107 are BGP peers. The network device 105, the network device 102, and the network device 104 are BGP peers. The network device 102, the network device 101, and the network device 103 are BGP peers. A controller 1 is configured to manage the AS domain 1. A controller 2 is configured to manage the AS domain 2. If a network device in the AS domain 1, for example, the network device 101, needs to forward a packet to the CE network device 1 along a path that meets a specific requirement, the network device 110 needs to forward the packet. However, because the network device 101 and the network device 110 are located in different domains, the network device 101 does not know a network topology structure of the AS domain 2 in which the network device 110 is located. Therefore, the network device 101 or the controller 1 cannot obtain, through calculation, a path that meets the requirement. If the controller 1 and the controller 2 can communicate, negotiation between the controller 1 and the controller 2 needs to be performed to obtain such a path. Alternatively, an inter-domain controller exists and such a forwarding path is obtained through uniform calculation.

It can be learned from the foregoing descriptions that, in the conventional technology, to implement inter-domain forwarding of a packet, a plurality of controllers need to interact with each other to obtain a complete forwarding path of the packet, and then packet forwarding is completed. Consequently, an entire packet forwarding control process is complex, and if the controllers cannot communicate with each other, the inter-domain forwarding of the packet cannot be implemented.

In view of this, an embodiment of this application provides a forwarding path determining method, to resolve the foregoing problem.

It should be noted that, the foregoing scenario is merely shown for ease of understanding. Embodiments of this application may be further applied to another scenario. Details are not described herein again.

Figure 2A:
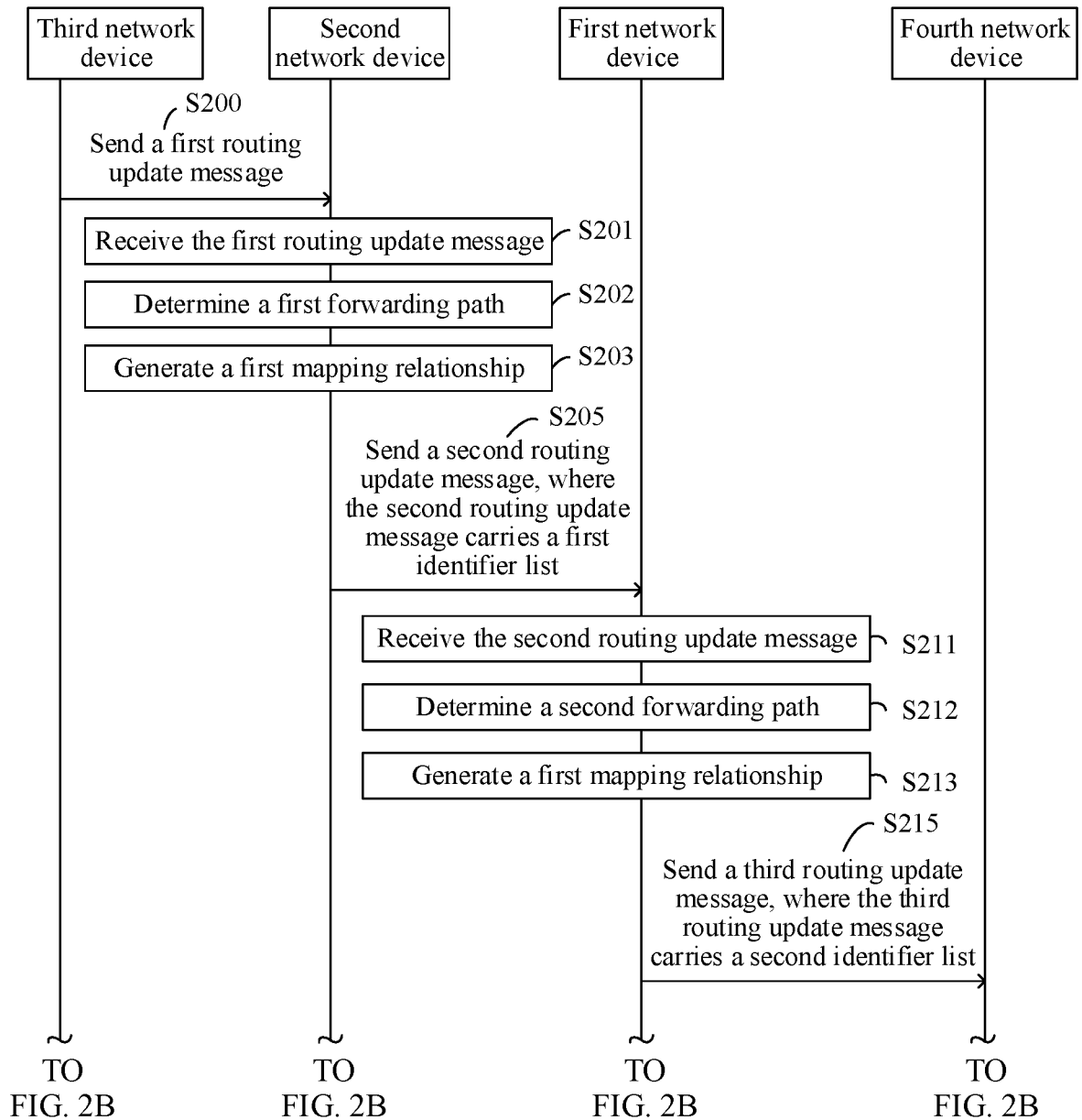
FIG. 2A and FIG. 2B are a flowchart of a forwarding path determining method according to an embodiment.
Figure 2B:
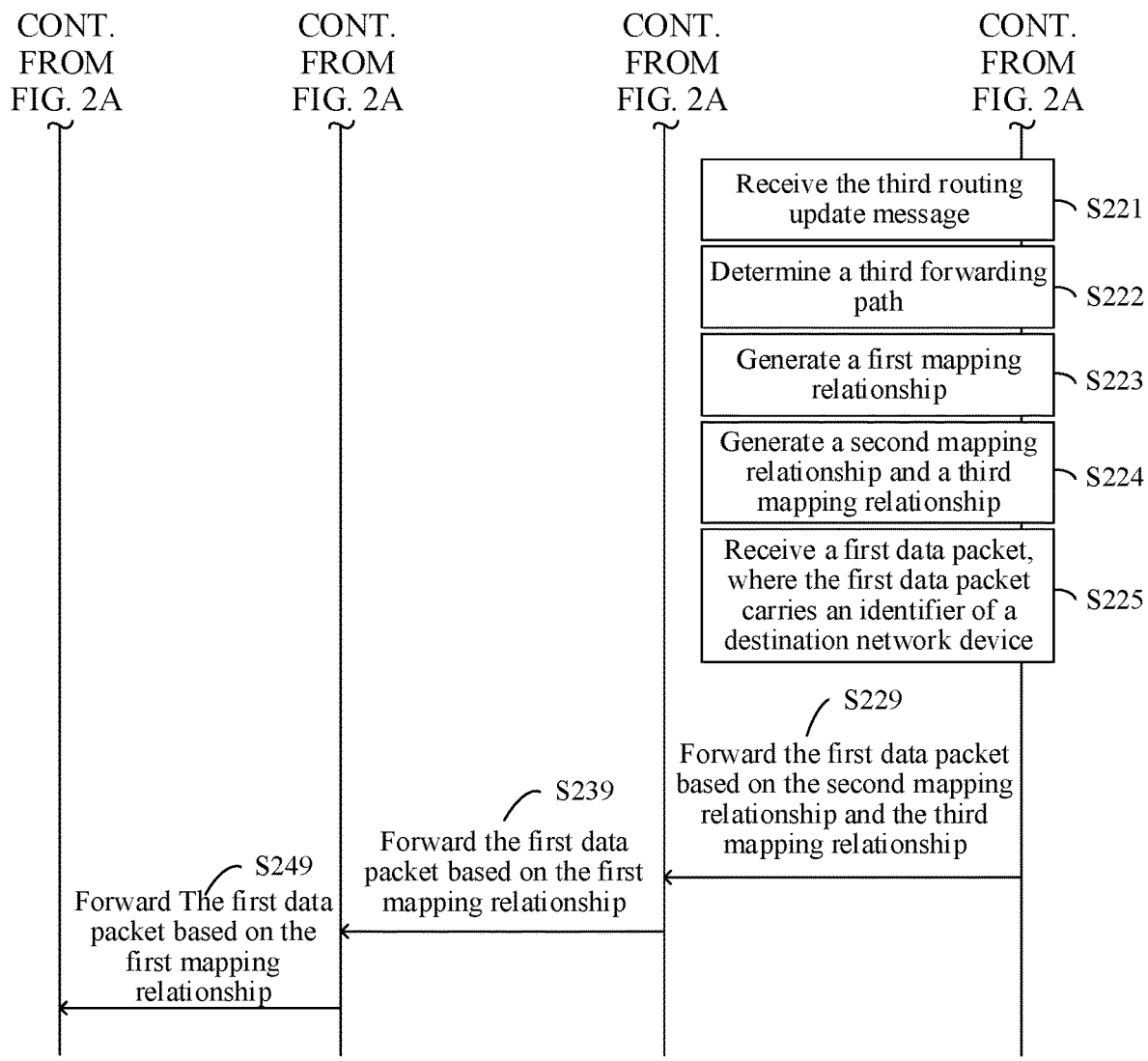

FIG. 2A and FIG. 2B are a flowchart of a forwarding path determining method according to an embodiment of this application. As shown in FIG. 2A and FIG. 2B, interaction in the method mainly includes a first network device, a second network device, a third network device, and a fourth network device. The fourth network device may be an ingress node in a segment routing network. The first network device and the second network device may be transit nodes in the segment routing network. The third network device may be an egress node in the segment routing network. The second network device and the first network device may be located in different AS domains. The fourth network device and the first network device may be located in a same domain.

The method shown in FIG. 2A and FIG. 2B is described in detail below. In this embodiment, the method is applied to the application scenario shown in FIG. 1. The network device 110 serves as the third network device, the network device 105 serves as the second network device, the network device 102 serves as the first network device, and the network device 101 serves as the fourth network device.

It should be understood that, this is merely an example. A person skilled in the art may also refer to this embodiment to perform a similar replacement and application. Examples are not provided one by one in this application.

The method includes the following operations.

Operation S200. The third network device sends a first routing update message to the second network device, where the routing update message carries an identifier of a destination network device.

In the application scenario shown in FIG. 1, the network device 110 sends the first routing update message to the network device 105, where the routing update message carries the identifier of the destination network device, for example, an IP prefix of a network to which the CE 1 connects.

Operation S201. The second network device receives the first routing update message sent by the third network device.

In an embodiment, the second network device obtains a network performance identifier.

In this embodiment of this application, the network performance identifier is an identifier of a network performance requirement, the network performance requirement may be a predefined network performance requirement that can be understood by a plurality of AS domains, and the network performance requirement may be a network performance requirement configured by a management system.

A manner in which the second network device obtains the network performance identifier may include but is not limited to any one of the following Manner 1, 2 or 3:

Manner 1: The second network device receives a control message sent by a controller, where the message carries the network performance identifier and the network performance requirement indicated by the network performance identifier.

Manner 2: An operation and maintenance personnel manually configure, on the second network device, the network performance identifier and the network performance requirement indicated by the network performance identifier.

Manner 3: The second network device receives the routing update message sent by the third network device (The third network device is a BGP peer of the second network device), where the routing update message carries the network performance identifier.

In an embodiment, the network performance identifier is carried in a color extended community attribute of the routing update message, and a value of the color (color) extended community attribute is the network performance identifier. For detailed content of the color extended community attribute, refer to the document Request for Comments (RFC) draft-ietf-idr-tunnel-encaps-07. Details are not described in this application.

In an embodiment, the network performance requirement is one or more of network requirements of latency, packet loss, bandwidth, and jitter.

In an example, when the network performance requirement is a latency requirement, the requirement may be specifically, for example, a low-latency forwarding path. When the network performance requirement is a bandwidth requirement, the requirement may be specifically, for example, to use a link of higher bandwidth if possible. The network requirement is represented as the network performance identifier, for example, color=80 may represent that a path to be used has a minimum sum of delay metrics (metric); color=90 may represent that a minimum value of available bandwidth of a path to be used is greater than a preset value, for example, 1G.

Operation S202. The second network device determines a first forwarding path, where the first forwarding path is a forwarding path from the second network device to the third network device.

In an embodiment, a method for determining the first forwarding path by the second network device is: The second network device obtains, through calculation based on the network performance identifier and an Interior Gateway Protocol (IGP) or a BGP gateway protocol, a forwarding path to the third network device.

In an embodiment, a method for determining the first forwarding path by the second network device is: The second network device requests, based on the received first routing update message, the first forwarding path from a controller that manages an AS domain in which the second network device is located.

In an embodiment, the first forwarding path meets network performance required by the network performance identifier.

Figure 3:
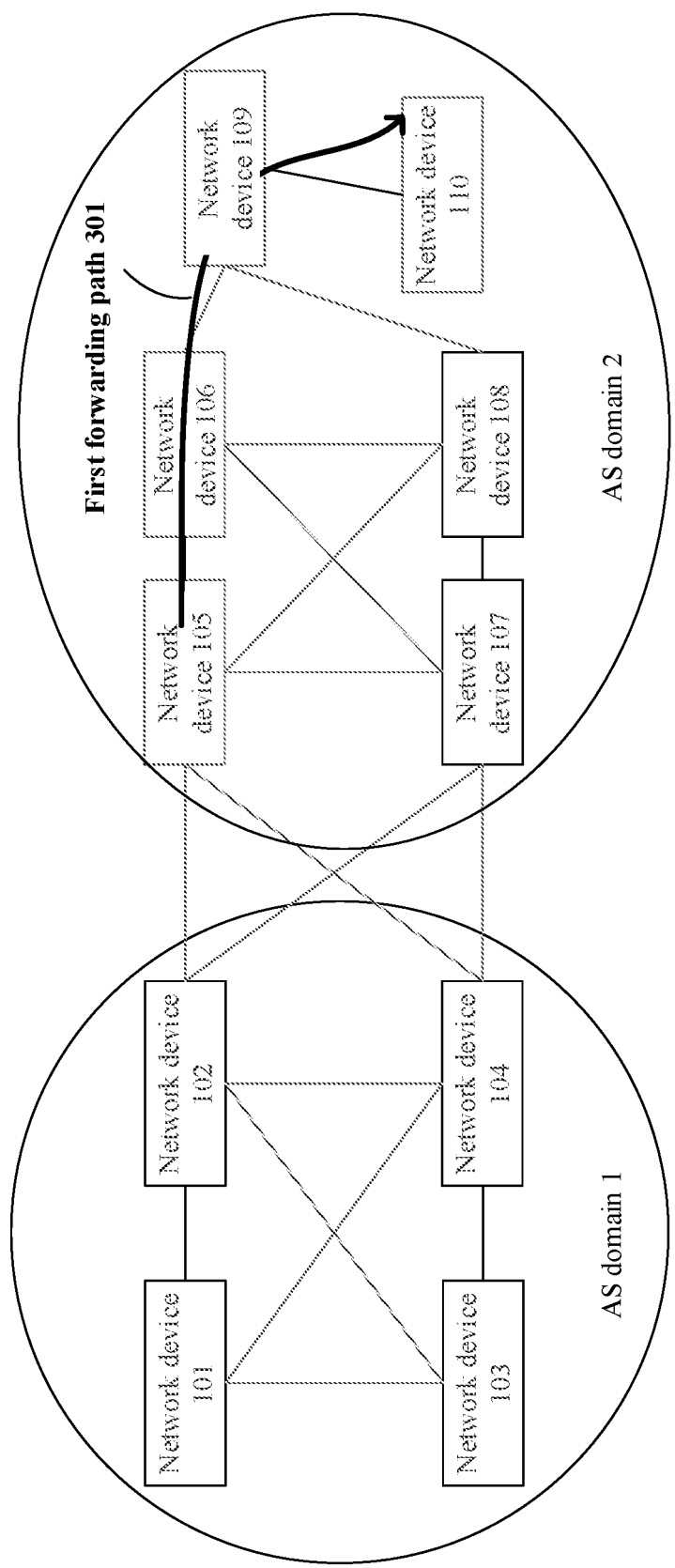
FIG. 3 is a schematic diagram of a first forwarding path according to an embodiment.

In an embodiment, the first forwarding path is a forwarding path in the segment routing network. In an example shown in FIG. 3, a first forwarding path determined by the network device 105 is shown as a first forwarding path 301 in FIG. 3: the network device 105→the network device 106→the network device 109→the network device 110. In other words, the network device 105 forwards a data packet to the network device 110 along the first forwarding path 301. In a possible case, the first forwarding path meets the network performance requirement indicated by the network performance identifier color=80.

Operation S203 (optional). The second network device generates a first mapping relationship between a first binding segment identifier corresponding to the second network device and an identifier set, where the identifier set includes a segment identifier of the second network device.

In an embodiment, the set identifier includes only the segment identifier of the second network device, and the segment identifier may be an End.X SID. This is not specifically limited in this application.

In an embodiment, the set identifier includes the segment identifier of the second network device and a segment identifier of some or all network device nodes on the first forwarding path.

In an example, the first mapping relationship generated by the second network device 105 is shown in Table 1. A5::B510 is the first binding segment identifier corresponding to the second network device, and corresponds to an identifier set (A5::C506, A6::106, A10::D110). The first binding segment identifier indicates the first forwarding path that is from the network device 105 to the network device 110. In the identifier set, A5::C506 is an End.X type segment identifier of the second network device, A6::106 is a segment identifier of the network device 106, and A10::D110 is a segment identifier of the network device 110.

It should be understood that, in this embodiment of this application, a naming rule of a binding segment identifier and a segment identifier that correspond to the SRv6 is used as an example. In an actual application, an MPLS label may also be used as the binding segment identifier or the segment identifier, for example, A5::B510 may be 10500, and A6::106 may be 10506. In the following descriptions of this embodiment of this application, a manner corresponding to the SRv6 is used as an example. Examples are not enumerated one by one.

It should be understood that, a value of the first binding segment identifier may be a binding segment identifier generated by the second network device, may be a binding segment identifier obtained by the second network device from a control message sent by the controller, or may be a binding segment identifier selected by the second network device from an existing local SID list according to a rule. This is not specifically limited in this application. In the embodiments of this application, a method for obtaining a value of a binding segment identifier corresponding to another device is similar to this method. Details are not described elsewhere in the embodiments of this application.

TABLE 1

| First binding segment identifier | Identifier set |
| --- | --- |
| A5::B510 | A5::C506, A6::106, A10::D110 |

Operation S205. The second network device sends a second routing update message to the first network device, where the second routing update message carries a first identifier list, the first identifier list carries the first binding segment identifier, and the first network device and the third network device are not in a same AS domain.

In an example, the first identifier list carried in the second routing update message is A5::B510.

In an embodiment, the second routing update message further carries the network performance identifier.

It should be understood that the second routing update message further carries the identifier of the destination network device.

In this embodiment of this application, to carry the first identifier list in the first routing update message, a new path attribute may be applied for, for example, a traffic engineering binding segment identifier attribute (SR BSID Attribute), and therefore a new type corresponding to the attribute needs to be applied for. For definitions of a BGP routing update message and a related attribute, refer to the standard Request Comments RFC (RFC) 4271 defined by the Internet Engineering Task Force (IETF). Details are not described herein again.

In an embodiment, the first routing update message includes a first type length value (TLV), and the first TLV includes the first identifier list.

A TLV is an encoding format and is mainly defined by three types of information: type, length, and value. The first TLV is a TLV that carries the first identifier list.

In an embodiment, the first TLV may be a TLV nested inside another TLV, that is, a sub-TLV of the another TLV. In an embodiment, the first TLV may alternatively be a sub-TLV of a new top TLV, where a top TLV is a TLV not nested inside another TLV.

In an embodiment, each TLV carries one element in the first identifier list.

Figures 4, 5:
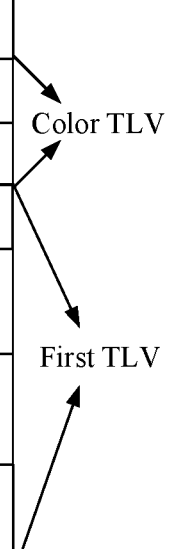
FIG. 4 is a schematic diagram of a first type length value TLV according to an embodiment.
FIG. 5 is a schematic diagram of a second type length value TLV according to an embodiment.

FIG. 4 is a schematic diagram of a format of the first TLV. A type of the first TLV may be a newly applied type of the traffic engineering binding segment identifier attribute described above, for example, may be 50. A value of the first TLV may include an element value in the first identifier list. For example, the first TLV may include an identifier field, the field may occupy 128 bits, and a value of the identifier field may be a segment identifier or a binding segment identifier.

In an embodiment, the network performance identifier and the foregoing first TLV are carried in a second TLV. FIG. 5 is a schematic diagram of a format of the second TLV. The second TLV includes two sub-TLVs, one TLV is a color TLV, the color TLV includes a color field, a value of the color field is the network performance identifier, and the network performance identifier may occupy 32 bits. The second TLV further includes the first TLV, and a type of the second TLV may be the newly applied type of the traffic engineering binding segment identifier attribute, for example, may be 50. This indicates the second TLV is the type of the traffic engineering binding segment identifier attribute.

It should be understood that, the second TLV may alternatively be included in another top TLV. For a schematic format of the top TLV, refer to the format of the second TLV shown in FIG. 5 for analogy. Details are not described herein again in this application.

In an embodiment, the network performance identifier is carried in the color extended community attribute of the first routing update message. In this embodiment of this application, a method for sending the BGP routing update message by the second network device to the first network device is used to transmit a segment list, a binding segment identifier list, or a list including a segment identifier and a binding segment identifier, where the segment list, the binding segment identifier list, or the list including the segment identifier and a binding segment identifier indicates the forwarding path that is from the second network device to the third network device. In this way, in a scenario in which there is no controller, or there are a plurality of controllers but the plurality of controllers cannot communicate with each other, an inter-domain forwarding path is determined. This helps simplify a packet forwarding control process.

Operation S211. The first network device receives the second routing update message sent by the second network device.

With reference to the foregoing example, the first identifier list carried in the second routing update message is A5::B510, and the binding segment identifier indicates the forwarding path that is from the network device 105 to the network device 110.

Operation S212. The first network device determines a second forwarding path based on the first identifier list carried in the second routing update message, where the second forwarding path is a forwarding path from the first network device to the third network device, and the second forwarding path includes the first forwarding path.

In an embodiment, that the first network device determines a second forwarding path based on the first identifier list carried in the second routing update message includes: 1. The first network device determines a forwarding path from the first network device to the second network device; and 2. The first network determines the determined forwarding path from the first network device to the second network device plus the first forwarding path indicated by the first identifier list as the second forwarding path.

In an embodiment, the first network device further obtains the network performance identifier.

A method for obtaining the network performance identifier by the first network device is similar to the method for obtaining the network performance identifier by the second network device. Details are not described herein again in this embodiment of this application.

For a method for determining the forwarding path from the first network device to the second network device by the first network device, refer to the foregoing method for determining the first forwarding path by the second network device. Details are not described herein again in this embodiment of this application.

Figure 6:
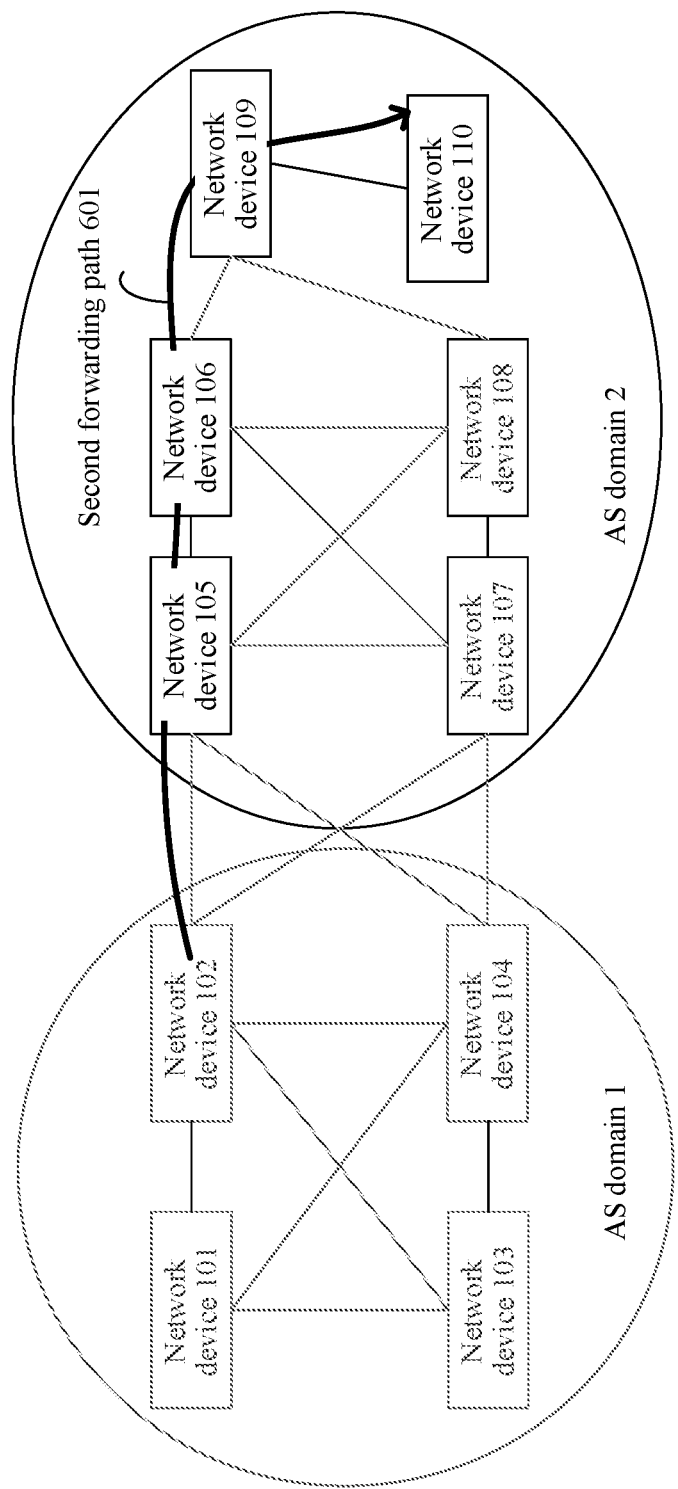
FIG. 6 is a schematic diagram of a second forwarding path according to an embodiment.

In the example shown in FIG. 6, the second forwarding path may be a second forwarding path 601 shown in FIG. 6: the network device 102→the network device 105→the network device 106→the network device 109→the network device 110.

Operation S213. The first network device generates a first mapping relationship.

In this embodiment of this application, the first network device may generate the first mapping relationship in the following Manner 1 or Manner 2:

Manner 1: The first network device generates the first mapping relationship between a first binding segment identifier corresponding to the first network device and a segment identifier of the first network device.

Manner 2: The first network device generates a mapping relationship between a first binding segment identifier and an identifier set, where the identifier set includes a segment identifier of the first network device and the first identifier list. With reference to the foregoing example, a first mapping relationship generated by the first network device according to Manner 1 is shown in Table 2, and a first mapping relationship generated by the first network device according to Manner 2 is shown in Table 3. The first binding segment identifier corresponding to the first network device is A2::B205, the segment identifier of the first network device is an End.X SID, that is, A2::C205, and A5::B510 is the first identifier list sent by the second network device to the first network device.

TABLE 2

| First binding segment identifier | Segment identifier of a first network device |
| --- | --- |
| A2::B205 | A2::C205 |

TABLE 3

| First binding segment identifier | Identifier set |
| --- | --- |
| A2::B205 | A2::C205, A5::B510 |

Operation S215. The first network device sends a third routing update message to the fourth network device, where the third routing update message carries a second identifier list.

Similar with the two manners in which the first network device generates the first mapping relationship, the second identifier list carried by the first network device may also include two different elements.

If the first network device generates the first mapping relationship according to Manner 1, the second identifier list includes the first binding segment identifier corresponding to the first network device and the first identifier list.

In an example, when the first mapping relationship corresponds to Table 2, the second identifier list is (A2::B205, A5::B510).

If the first network device generates the first mapping relationship according to Manner 2, the second identifier list includes only the first binding segment identifier corresponding to the first network device.

In an example, when the first mapping relationship corresponds to Table 3, the second identifier list is (A2::B205).

It should be understood that, in a same AS domain, only one mapping manner and a corresponding manner of determining an identifier list carried in a routing update message are generally used. However, different manners may be configured in different AS domains. For example, different manners are used in the AS domain 1 and the AS domain 2. Details are not described in this application.

In an embodiment, the third routing update message further carries the network performance identifier.

It should be understood that, a manner of carrying the second identifier list in the third routing update message is the same as the manner of carrying the first identifier list in the second routing update message. Details are not described herein again in this application.

Operation S221. The fourth network device receives the third routing update message sent by the first network device.

With reference to the foregoing example, the second identifier list carried in the third routing update message may be:

representation manner 1: (A2::B205, A5::B510); and
representation manner 2: (A2::B205).

Operation S222. The fourth network device determines a third forwarding path based on the second identifier list carried in the third routing update message, where the third forwarding path is a forwarding path from the fourth network device to the third network device, and the third forwarding path includes the second forwarding path indicated by the second identifier list. It should be understood that, the fourth network device is the ingress node in the segment routing network in this embodiment of this application.

A manner in which the fourth network device determines the third forwarding path is similar to the manner in which the first network device determines the second forwarding path. For details, refer to operation S212 and related optional manners. Details are not described herein again in this embodiment of this application.

In an example, corresponding to the foregoing two representation manners of the second identifier list, a first mapping relationship generated by the fourth network device is separately shown in Table 4 and Table 5. That is, when the second identifier list is (A2::B205, A5::B510), the first mapping relationship generated by the fourth network device is shown in Table 4. When the second identifier list is (A2::B205), the first mapping relationship generated by the fourth network device is shown in Table 5.

TABLE 4

| First binding segment identifier | Segment identifier of a first network device |
| --- | --- |
| A1::B102 | A1::C102 |

TABLE 5

| First binding segment identifier | Identifier set |
| --- | --- |
| A1::B102 | A1::C102, A2::B205 |

Operation S224. Because the fourth network device 101 is the ingress node of the segment routing network, the fourth network device further generates a second mapping relationship and a third mapping relationship.

In an embodiment, the second mapping relationship is a mapping relationship between a second binding segment identifier corresponding to the first network device and the identifier of the destination network device.

In an example, the second mapping relationship is shown in Table 6. The identifier of the destination network device is an end prefix identifier 20/8 in the third routing update message, and the second binding segment identifier A1::B110 indicates a forwarding path from the fourth network device 101 to the first network device 110.

TABLE 6

| Identifier of a destination network device | Second binding segment identifier |
|---|---|
| 20/8 | A1::B110 |

In an embodiment, the second mapping relationship further includes the network performance identifier. The second mapping relationship is shown in Table 7. The network performance identifier is 80, and represents a network performance requirement of an attribute, for example, lower network latency if possible.

TABLE 7

| Identifier of a destination network device, network performance identifier | Second binding segment identifier |
|---|---|
| 20/8, 80 | A1::B110 |

In an embodiment, the third mapping relationship generated by the fourth network device is a mapping relationship between the second binding segment identifier and a binding segment identifier set, and the binding segment identifier set includes a first binding segment identifier corresponding to the fourth network device and the second identifier list. Alternatively, the binding segment identifier set includes only a first binding segment identifier corresponding to the fourth network device.

In an example, when the second identifier list is (A2::B205, A5::B510), the third mapping relationship generated by the fourth network device is shown in Table 8. When the second identifier list is (A2::B205), the third mapping relationship generated by the fourth network device is shown in Table 9.

TABLE 8

| Second binding segment identifier | Binding segment identifier set |
|---|---|
| A1::B110 | A1::B102, A2::B205, A5::B510 |

TABLE 9

| Second binding segment identifier | Binding segment identifier set |
|---|---|
| A1::B110 | A1::B102 |

Operation S225. The fourth network device receives a first data packet, where the data packet carries the identifier of the destination network device.

In an embodiment, the first data packet further carries the network performance identifier.

Operation S229. The fourth network device forwards the first data packet to the first network device based on the second mapping relationship and the third mapping relationship.

The fourth network device determines, based on the second mapping relationship in Table 6 or Table 7, a second binding segment identifier corresponding to the first data packet, and searches, based on the determined second binding segment identifier, a binding segment identifier set that corresponds to the third mapping relationship and the second binding segment identifier, where the second binding segment identifier indicates the forwarding path that is from the fourth network device to the third network device.

The fourth network device carries the binding segment identifier set in the first data packet, further queries the first mapping relationship (for example, Table 4 or Table 5) by using the first binding segment identifier (for example, A1::B102) corresponding to the fourth network device in the binding segment identifier set, and performs a related operation. The segment routing network processing method adopted herein is conventional, and details are not described herein again in this application.

In an embodiment, the first network device receives the first data packet sent by the fourth network device, where the data packet carries a binding segment identifier (for example, A2::B205) corresponding to the first network device.

Operation S239. After performing a related operation based on a mapping relationship that is included in the first network device, the first network device forwards the first data packet to the second network device.

In an embodiment, the second network device receives the first data packet sent by the first network device, where the data packet carries a binding segment identifier (for example, A5::B510) corresponding to the second network device.

Operation S249. After performing a related operation based on the first mapping relationship that is included in the second network device, the second network device forwards the first data packet to the third network device.

The forwarding path determining method according to the embodiments of this application are described above. The following describes the first network device and the second network device according to the embodiments of this application.

Figure 7:
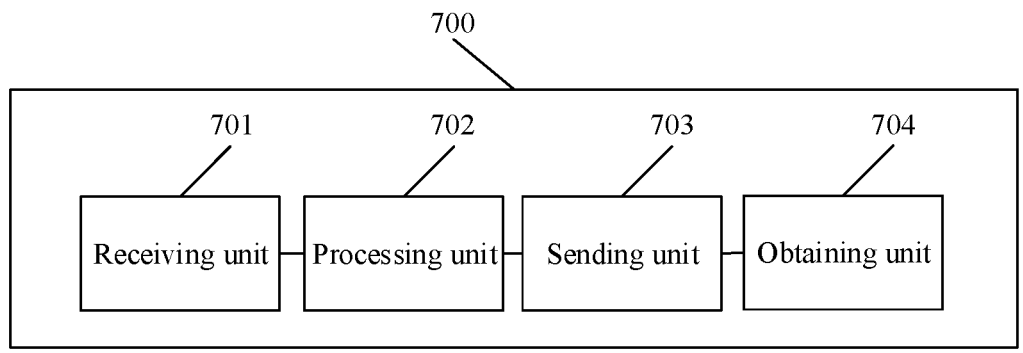
FIG. 7 is a schematic diagram of a structure of a first network device according to an embodiment.

FIG. 7 is a first network device 700 according to an embodiment of this application. The first network device 700 may perform the method performed by the first network device (e.g., in a transit node) and the fourth network device (e.g., in an ingress node) shown in FIG. 2A and FIG. 2B. The first network device 700 includes a receiving unit 701, a processing unit 702, a sending unit 703, and an obtaining unit 704. When the first network device 700 is a transit node in a network, the receiving unit 701 may be configured to perform, for example, operation S211 in the embodiment of FIG. 2A and FIG. 2B; the processing unit 702 may be configured to perform, for example, operation S212 and operation S213 in the embodiment of FIG. 2A and FIG. 2B; the sending unit 703 may be configured to perform, for example, operation S215 in the embodiment of FIG. 2A and FIG. 2B; and the obtaining unit 704 may be configured to perform the operations and the optional method in which the first network device obtains the network performance identifier in the method shown in FIG. 2A and FIG. 2B. When the first network device 700 is an ingress node in a network, the receiving unit 701 may be configured to perform, for example, operation S215 and operation S225 in the embodiment of FIG. 2A and FIG. 2B; the processing unit 702 may be configured to perform, for example, operation S222, operation S223, and operation S224 in the embodiment of FIG. 2A and FIG. 2B; the sending unit 703 may be configured to perform, for example, operation S229 in the embodiment of FIG. 2A and FIG. 2B; and the obtaining unit 704 may be configured to perform the operations and the optional method in which the fourth network device obtains the network performance identifier in the method shown in FIG. 2A and FIG. 2B.

It should be noted that, when the first network device 700 provided in the embodiments disclosed herein and illustrated in part with FIG. 7 performs the foregoing determining of the forwarding path, division into the foregoing functional units is merely used as an example for description. In an actual application, the foregoing functions may be allocated to different functional units for implementation as required. In other words, an internal structure of the first network device is divided into different functional units, to implement all or some of the functions described above. Alternatively, a unified functional unit is used to complete the functions of the foregoing plurality of units. It should be understood that, the first network device provided in the foregoing embodiment and the foregoing forwarding path determining method embodiments belong to a same concept. The operations performed by the units of the first network device are merely used as examples for description, and this does not mean that the units of the first network device do not perform another operation or optional method in the foregoing disclosure. For an implementation process, refer to the description of the methods disclosed herein, and details are not described herein again.

Figure 8:
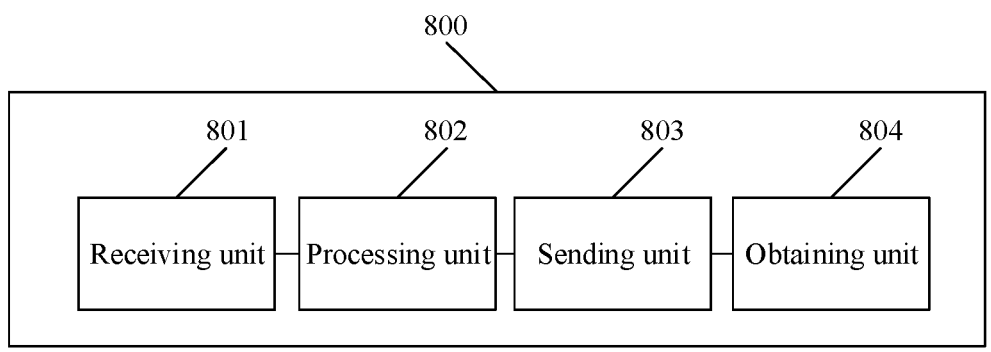
FIG. 8 is a schematic diagram of a structure of a second network device according to an embodiment.

FIG. 8 is a second network device 800 according to an embodiment of this application. The second network device 800 may perform the method shown in FIG. 2A and FIG. 2B. The second network device 800 includes a processing unit 802, a sending unit 803, a receiving unit 801, and an obtaining unit 804. The processing unit 802 may be configured to perform, for example, operation S202 and operation S203 in the embodiment of FIG. 2A and FIG. 2B. The sending unit 803 may be configured to perform, for example, operation S215 and operation S239 in the embodiment of FIG. 2A and FIG. 2B. The receiving unit 801 may be configured to perform operation S211. The obtaining unit 804 may be configured to perform the operations and the optional method for obtaining the network performance identifier in the method shown in FIG. 2A and FIG. 2B.

It should be noted that, when the second network device provided in the embodiment of FIG. 8 performs the foregoing determining of the forwarding path, division into the foregoing functional units is merely used as an example for description. In an actual application, the foregoing functions may be allocated to different functional units for implementation as required. That is, an internal structure of the second network device is divided into different functional units, to implement all or some of the functions described above. Alternatively, a unified functional unit is used to complete the functions of the foregoing plurality of units. It should be understood that, the second network device provided in the foregoing embodiment and the foregoing forwarding path determining method embodiments belong to a same concept. The operations performed by the units of the second network device are merely used as examples for description, and this does not mean that the units of the second network device do not perform another operation or optional method in the foregoing embodiments. For an implementation process, refer to the method embodiments, and details are not described herein again.

The first network device and the second network device according to the embodiments of this application are described above. The following describes possible product forms of the first network device and the second network device. It should be understood that, any product in any form that has the feature of the first network device in FIG. 7 and any product in any form that has the feature of the second network device in FIG. 8 fall within the protection scope of this application. It should be further understood that the following descriptions are merely an example, and do not limit product forms of the first network device and the second network device according to the embodiments of this application.

In a possible product form, the first network device or the second network device according to the embodiments of this application may be implemented by using a general bus architecture.

Figure 9:
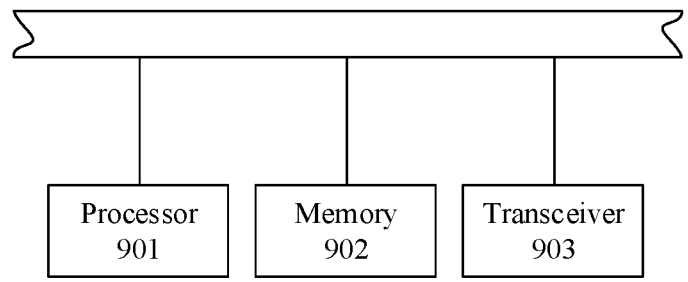
FIG. 9 is a schematic diagram of a structure of a first network device according to an embodiment.

As shown in FIG. 9, an embodiment of this application provides a first network device 900. The first network device 900 includes a processor 901, a memory 902, and a transceiver 903. The memory 902 stores at least one instruction, and the processor 901 is configured to load the instruction, so that the first network device 900 performs the foregoing forwarding path determining method. The processor 901, the memory 902, and the transceiver 903 may be connected through a bus.

The processor 901 may be a central processing unit (CPU), an application-specific integrated circuit (ASIC), or one or more integrated circuits configured to control program execution of solutions of this application.

The memory 902 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer, but is not limited thereto.

Figure 10:
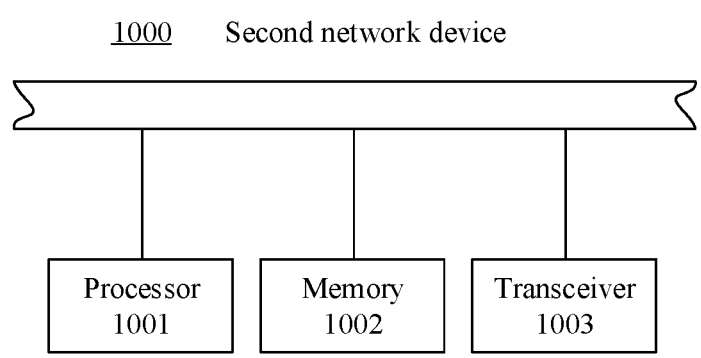
FIG. 10 is a schematic diagram of a structure of a second network device according to an embodiment.

As shown in FIG. 10, an embodiment of this application provides a second network device 1000. The second network device 1000 includes a processor 1001, a memory 1002, and a transceiver 1003. The memory 1002 stores at least one instruction, and the processor 1001 is configured to load the instruction, so that the second network device 1000 performs the foregoing forwarding path determining method. The processor 1001, the memory 1002, and the transceiver 1003 may be connected through a bus. A product form of the processor 1001 is similar to that of the processor 901, and a product form of the memory 1002 is similar to that of the memory 902. Details are not described herein.

In a possible product form, the first network device or the second network device according to this embodiment of this application may be implemented by a general-purpose processor.

A general-purpose processor for implementing the first network device includes a processing circuit, and an output interface and an input interface that are internally connected to and communicated with the processing circuit. The processing circuit is configured to perform operation S212, operation S213, operation S222, operation S223, and operation S224. The processing circuit is configured to control the input interface to perform operation S211 or operation S221. The processing circuit is further configured to control the output interface to perform operation S215 and operation S239 or operation S229. The general-purpose processor further includes a storage medium, and the storage medium is configured to store instructions executed by the processing circuit.

A general-purpose processor for implementing the second network device includes a processing circuit, and an input interface and an output interface that are internally connected to and communicated with the processing circuit. The processing circuit is configured to control the output interface to perform operation S205 or perform operation S249. In an embodiment, the processing circuit is further configured to control the input interface to perform operation S201 and operation S249, and the processing circuit further performs operation S202 and operation S203. In an embodiment, the general-purpose processor may further include a storage medium, and the storage medium is configured to store instructions executed by the processing circuit.

In a possible product form, the first network device or the second network device provided according to this embodiment of this application may alternatively be implemented by using the following: one or more field programmable gate arrays (FPGA), programmable logic devices (PLD), controllers, state machines, gate logic, discrete hardware components, any other appropriate circuits, or any combination of circuits that can perform the various functions described in this application.

It should be understood that, the first network device or the second network device in the foregoing product forms respectively have any function of the first network device or the second network device in the foregoing forwarding path determining method embodiments. Details are not described herein again.

A person of ordinary skill in the art may be aware that, in combination with the examples described in the embodiments disclosed in this specification, method operations and units can be implemented by electronic hardware, computer software, or a combination thereof. To clearly describe the interchangeability between the hardware and the software, the foregoing has generally described operations and composition of each embodiment according to functions. Whether the functions are performed by hardware or software depends on a particular application and a design constraint condition of the technical solutions. A person of ordinary skill in the art may use different methods to implement the described functions for each particular application without departing from embodiments disclosed herein.

It may be clearly understood by a person skilled in the art that, for the purpose of convenient and brief description, for a detailed working process of the foregoing described system, apparatuses, and units, refer to a corresponding process in the foregoing method embodiments, and details are not described herein again.

In the several embodiments provided in this application, it should be understood that the disclosed apparatus and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or the communication connections between the apparatuses or the units may be implemented in an electrical form, a mechanical form, or another form.

The units described as separate parts may or may not be physically separate, and parts displayed as units may or may not be physical units, may be located in one place, or may be distributed onto a plurality of network units. Some or all of the units may be selected based on actual requirements to achieve the objectives of the solutions in the embodiments of this application.

In addition, the processing units in the embodiments of this application may be dispersed in a plurality of functional units, or may be integrated into one processing unit. Each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for indicating a computer device (which may be a personal computer, a server, or a network device) to perform all or some of the operations of the method described in the embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

All or some of the foregoing embodiments may be implemented by using software, hardware, firmware, or any combination thereof. When software is used to implement the embodiments, all or some of the embodiments may be implemented in a form of computer program product. The computer program product includes one or more computer program instructions. When the computer program instructions are loaded and executed on a computer, the procedure or functions according to the embodiments of this application are completely or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer program instructions may be transmitted from one website, computer, server, or data center to another website, computer, server, or data center in a wired or wireless manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid-state drive), or the like.

A person of ordinary skill in the art may understand that all or some of the operations of the embodiments may be implemented by using hardware or a program instructing related hardware. The program may be stored in a computer-readable storage medium, and the storage medium may include a read-only memory, a magnetic disk, or an optical disc.

The foregoing descriptions are only optional embodiments of this application, but are not intended to limit this application. Any modification, equivalent replacement, improvement, or the like made without departing from the spirit and principle of this application shall fall within the protection scope of this application.

What is claimed is:

1. A method, comprising:
   receiving, by a first network device, a first routing update message that is a Border Gateway Protocol (BGP) routing update message, wherein the first routing update message carries one or more identifiers used to indicate a first forwarding path that is from a second network device to a third network device, and the first network device and the third network device do not belong to a same domain; and
   determining, by the first network device, a second forwarding path based on the one or more identifiers carried in the first routing update message, wherein the second forwarding path is a forwarding path that is from the first network device to the third network device, and the second forwarding path comprises the first forwarding path.

2. The method according to claim 1, wherein the method further comprises:
   obtaining, by the first network device, a network requirement identifier,
   wherein the second forwarding path corresponds to the network requirement identifier.

3. The method according to claim 2,
   wherein the first routing update message further comprises the network requirement identifier, the obtaining, by the first network device, a network requirement identifier comprises:
   obtaining, by the first network device, the network requirement identifier from the first routing update message; or
   wherein the obtaining, by the first network device, a network requirement identifier comprises:
   receiving, by the first network device, a control message sent by a controller, and wherein the control message comprises the network requirement identifier; and
   obtaining, by the first network device, the network requirement identifier from the control message.

4. The method according to claim 2, further comprising:
   generating, by the first network device, a first mapping relationship, wherein
   the first mapping relationship is a mapping relationship between a first binding segment identifier corresponding to the first network device and a segment identifier of the first network device; or
   the first mapping relationship is a mapping relationship between a first binding segment identifier corresponding to the first network device and an identifier set, wherein the identifier set comprises a segment identifier of the first network device and the one or more identifiers.

5. The method according to claim 4, wherein the one or more identifiers are carried in a first type length value (TLV) of the first routing update message.

6. The method according to claim 1, wherein an identifier of the one or more identifiers comprises a segment identifier or a binding segment identifier.

7. The method according to claim 6, wherein the segment identifier comprises a Multiprotocol Label Switching (MPLS) label or a Segment Routing over Internet Protocol version 6 (SRv6) identifier.

8. The method according to claim 1, wherein when the first network device is a transit node in a segment routing network, the method further comprises:
   sending, by the first network device, a second routing update message to a fourth network device, wherein the second routing update message carries another identifier or other identifiers.

9. The method according to claim 8, wherein
   when a first mapping relationship is a mapping relationship between a first binding segment identifier and a segment identifier of the first network device, the another identifier or other identifiers comprises the first binding segment identifier and the one or more identifiers; or
   when the first mapping relationship is a mapping relationship between the first binding segment identifier and an identifier set, the another identifier or other identifiers comprises only the first binding segment identifier.

10. The method according to claim 8, wherein the second routing update message further carries a network requirement identifier corresponding to the second forwarding path.

11. A method, comprising:
   determining, by a second network device, one or more identifiers, wherein the one or more identifiers are used to indicate a first forwarding path that is from the second network device to a third network device; and
   sending, by the second network device, a first routing update message that is a Border Gateway Protocol (BGP) routing update message, wherein the first routing update message carries the one or more identifiers, and a first network device and the third network device do not belong to a same domain, the first routing update message is used to determine a second forwarding path, wherein the second forwarding path is a forwarding path that is from the first network device to the third network device, and the second forwarding path comprises the first forwarding path.

12. The method according to claim 11, further comprising:
   obtaining, by the second network device, a network requirement identifier, wherein the network requirement identifier corresponds to the first forwarding path.

13. The method according to claim 12, wherein the obtaining, by the second network device, the network requirement identifier comprises:
   receiving, by the second network device, a second routing update message, and wherein the second routing update message comprises the network requirement identifier; and
   obtaining, by the second network device, the network requirement identifier from the second routing update message; or wherein the obtaining, by the second network device, the network requirement identifier comprises:
receiving, by the second network device, a control message sent by a controller, and wherein the control message comprises the network requirement identifier; and
obtaining, by the second network device, the network requirement identifier from the control message.

14. A first network device, comprising:
at least one processor;
one or more memories coupled to the at least one processor and storing instructions for execution by the at least one processor, the instructions instruct the at least one processor to cause the first network device to:
receive a first routing update message that is a Border Gateway Protocol (BGP) routing update message, wherein the first routing update message carries one or more identifiers used to indicate a first forwarding path that is from a second network device to a third network device, and the first network device and the third network device do not belong to a same domain; and
determine a second forwarding path based on the one or more identifiers carried in the first routing update message, wherein the second forwarding path is a forwarding path that is from the first network device to the third network device, and the second forwarding path comprises the first forwarding path.

15. The first network device according to claim 14, wherein the instructions further instruct the at least one processor to cause the first network device to:
obtain a network requirement identifier, and wherein the second forwarding path corresponds to the network requirement identifier.

16. The first network device according to claim 15,
wherein the first routing update message further comprises the network requirement identifier, and the instructions further instruct the at least one processor to cause the first network device to:
obtain the network requirement identifier from the first routing update message; or
wherein the instructions further instruct the at least one processor to cause the first network device to:
receive a control message sent by a controller, and wherein the control message comprises the network requirement identifier; and
obtain the network requirement identifier from the control message.

17. A second network device, comprising:
at least one processor;
one or more memories coupled to the at least one processor and storing instructions for execution by the at least one processor, the instructions instruct the at least one processor to cause the second network device to:
determine one or more identifiers, wherein the one or more identifiers are used to indicate a first forwarding path that is from the second network device to a third network device; and
send a first routing update message that is a Border Gateway Protocol (BGP) routing update message, wherein the first routing update message carries the one or more identifiers, and a first network device and the third network device do not belong to a same domain, the first routing update message is used to determine a second forwarding path, wherein the second forwarding path is a forwarding path that is from the first network device to the third network device, and the second forwarding path comprises the first forwarding path.

18. The second network device according to claim 17, wherein the instructions further instruct the at least one processor to cause the second network device to:
obtain a network requirement identifier,
wherein the network requirement identifier corresponds to the first forwarding path.

19. The second network device according to claim 18,
wherein that instructions further instruct the at least one processor to cause the second network device to:
receive a second routing update message, and wherein the second routing update message comprises the network requirement identifier; and
obtain the network requirement identifier from the second routing update message; or
wherein that instructions further instruct the at least one processor to cause the second network device to:
receive a control message sent by a controller, and wherein the control message comprises the network requirement identifier; and
obtain the network requirement identifier from the control message.

* * * * *